(12) United States Patent
Smith et al.

(10) Patent No.: US 8,358,403 B1
(45) Date of Patent: Jan. 22, 2013

(54) REMOTE PLATFORM ENHANCED MUNITIONS DETECTION

(75) Inventors: Robert A. Smith, Hampton Cove, AL (US); Steve B. Pickard, Guntersville, AL (US); David K. Mefford, Huntsville, AL (US); Aaron Frost Markowitz, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 712 days.

(21) Appl. No.: 12/543,319

(22) Filed: Aug. 18, 2009

(51) Int. Cl.
*G01C 3/08* (2006.01)
(52) U.S. Cl. .......................................... 356/5.01; 356/5.1
(58) Field of Classification Search ................. 356/5.01; 701/245
See application file for complete search history.

(56) References Cited

U.S. PATENT DOCUMENTS

| 6,631,333 B1 | 10/2003 | Lewis et al. |
| 7,570,349 B2 | 8/2009 | Vachss et al. |
| 2007/0221863 A1 | 9/2007 | Zipf |

OTHER PUBLICATIONS

Munson, et al. Article entitled, "Laser-Based Detection Methods for Explosives," from the Army Research Laboratory, Article No. ARL-TR-4279 dated Sep. 2007; 76 pages.

*Primary Examiner* — Luke Ratcliffe
(74) *Attorney, Agent, or Firm* — Hope Baldauff Hartman, LLC

(57) ABSTRACT

Remote platform enhanced munitions detection can support improved detection of munitions by separating the signal source platform from a detector on a remote mobile platform. The source platform may support a large, complex, or expensive optical laser or radio frequency source. The source platform may also support a remote signal processing system. The electromagnetic source may be used to illuminate munitions or threat material from a standoff distance. The mobile platform may be maneuvered and positioned closer to the measurement target. The mobile platform may be equipped with an appropriate electromagnetic detector to obtain measurement data at different ranges and positions around the measurement target. The mobile platform may also provide an articulating arm with a mirror or reflector to support non-line-of-sight measurements.

12 Claims, 5 Drawing Sheets

REMOTE PLATFORM ENHANCED MUNITIONS DETECTION

BACKGROUND

The detection of munitions can be an important aspect of military and security operations. Munitions can include explosives, bombs, landmines, missiles, warheads, improvised explosive devices, anti-personnel weapons, ammunition, bullets, mortars, rockets, propellants, fuels or any explosive or projectile object. Detecting munitions from a distant standoff position can improve the safety of personnel as well as the security of detection operations.

Conventional optical measurement and sensing techniques may be used to remotely detect munitions. However, signal to clutter ratios in areas surrounding measurement targets may complicate remote optical detection. Remote detection techniques may also be limited in range due to signal loss. Such signal loss may result from both atmospheric clutter and attenuation of the signal during round trip propagation. Remote optical detection may also require prior knowledge as to specific locations of munitions or other measurement targets in order to obtain meaningful sensor data. Furthermore, the use of high powered optical beams for sensing can pre-detonate explosives or other munitions.

SUMMARY

It should be appreciated that this Summary is provided to introduce a selection of concepts in a simplified form that are further described below in the Detailed Description. This Summary is not intended to be used to limit the scope of the claimed subject matter.

According to aspects of the technology presented herein, a remote platform enhanced munitions detection system transmits a first electromagnetic beam from a source platform to a measurement target. The first electromagnetic beam interacts with the measurement target transforming the first electromagnetic beam into a second electromagnetic beam. A remote mobile platform receives the second electromagnetic beam. The second electromagnetic beam is processed to determine characteristics of the measurement target. According to other embodiments, information associated with second electromagnetic beam may transmitted to a remote processing module.

The features, functions, and advantages discussed herein may be achieved independently in various embodiments of the present description or may be combined in yet other embodiments, further details of which can be seen with reference to the following description and drawings.

DETAILED DESCRIPTION

The following detailed description discloses systems and methods for remote platform enhanced munitions detection. This description is most readily understood with reference to the attached drawings, in which like reference numbers may appear in different drawings to refer to similar elements.

Utilizing the concepts and technologies described herein, remote platform enhanced munitions detection can support improved detection of munitions by separating the signal source platform from a detector on a remote mobile platform. Separating the signal source platform from the remote mobile platform can allow a large, complex, or expensive optical laser source to be used in conjunction with a mobile detector that can be positioned much closer to a measurement target. The source platform may also support a remote signal processing system of a size and complexity that could not be supported on a mobile detector platform alone. The optical laser source may be used to illuminate munitions or threat material from a standoff distance. The mobile platform may be maneuvered and positioned closer to the measurement target. The mobile platform may be equipped with an appropriate optical detector to obtain measurement data at different ranges and positions around the measurement target. The mobile platform may also provide an articulating arm with a mirror or reflector to support non-line-of-sight measurements.

As will be described below, the mobile platform may be implemented as a mobile robot. The mobile platform may provide improved positioning capabilities for placing a detector near a measurement target. Improved placement of the mobile platform may include positioning the detector closer to the target as well as positioning the detector to receive back scattered signals. The detector on the mobile platform may be used to receive signals back scattered from the surface of a target. The detector may also receive signals back scattered from vapors surrounding the target or transmitted through vapor surrounding a target.

Remote platform enhanced munitions detection may also leverage multiple remote platforms. For example, one remote platform may host a positionable reflector or mirror to achieve non-line-of-sight measurement, while another remote platform may host a detector for measurement sensing. System embodiments featuring multiple remote platforms are also presented herein.

Figure 1:
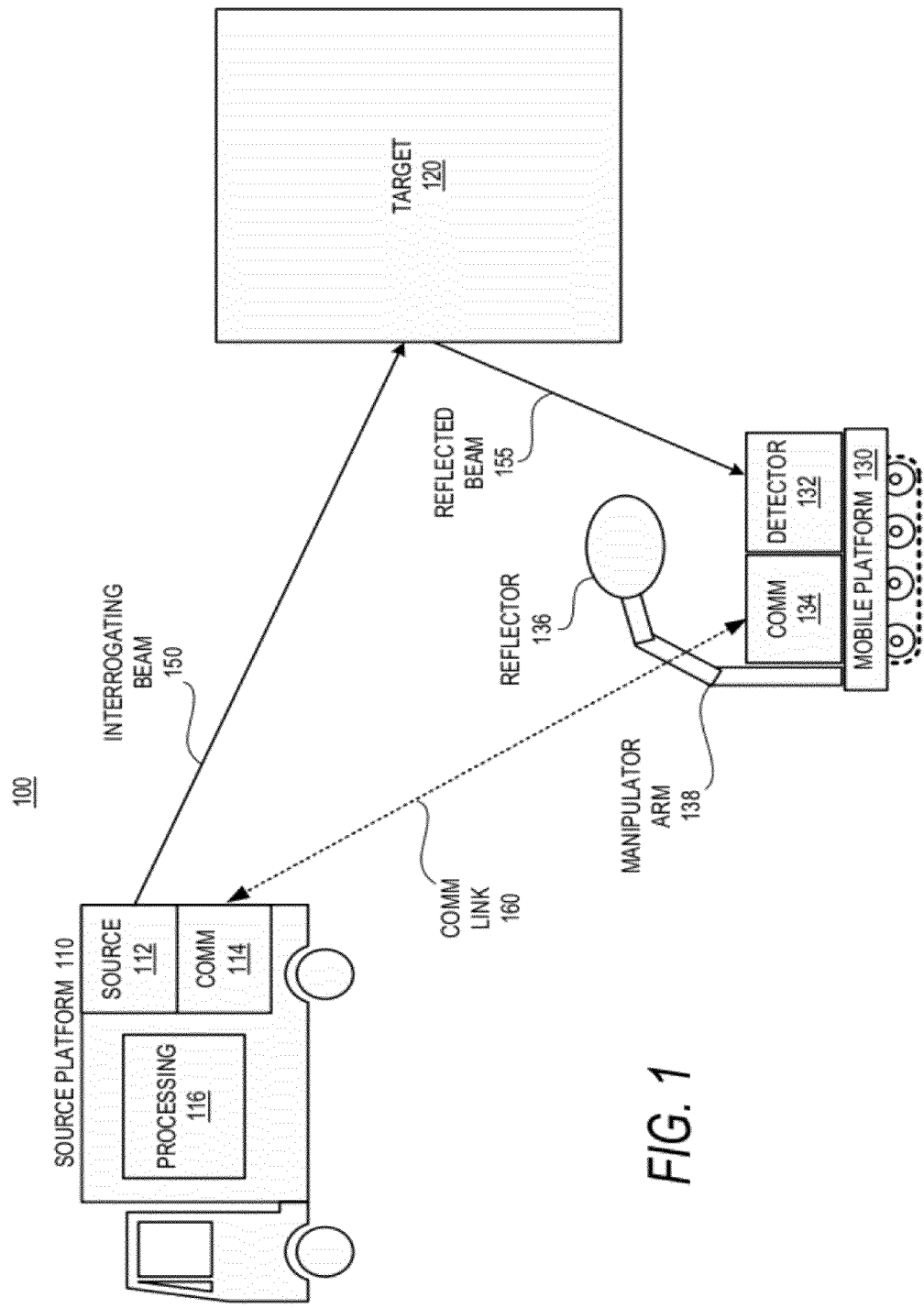
FIG. 1 is a schematic diagram illustrating a remote platform enhanced munitions detection system according to one or more embodiments presented herein.

Turning first to FIG. 1, a schematic diagram illustrates a remote platform enhanced munitions detection system 100 according to one or more embodiments presented herein. A source platform 110 may be positioned at a standoff distance. The remotely positioned source platform 110 may include an electromagnetic source 112. The electromagnetic source 112 may be a laser, other light source, a radio frequency source, or any electromagnetic radiation source. The electromagnetic source 112 may generate an interrogating beam 150. The interrogating beam 150 may be transmitted from the source platform 110 to reflect from the target 120. The target 120 may include one or more potential munitions or other measurement targets. The interrogating beam 150 may be reflected from the target 120 as a reflected beam 155.

A mobile platform 130 may host a detector 132 for receiving the reflected beam 155 after reflection from the measurement target 120. The mobile platform 130 may be a robot, a remote control device, a drone, or other positionable sensor platform according to various embodiments. The mobile platform 130 may support a manipulator arm 138. The manipulator arm 138 may be articulated, hinged, rotating, telescoping, or otherwise positionable. The manipulator arm 138 may position an electromagnetic reflector 136. The electromagnetic reflector 136 may be a mirror, a radio frequency reflector, or other reflector of electromagnetic radiation. According to other embodiments, the electromagnetic reflector 136 may be directly mounted to the mobile platform 130 and positioned by movement of the mobile platform 130. Deployment of the electromagnetic reflector 136 may also be provided by another positioning mechanism. Similarly, the detector 132 may also be positionable by the mobile platform 130 using a manipulator arm 138 or other positioning mechanism. Additional detectors 132 may be added to the system 100 by introducing multiple mobile platforms 130. These additional detectors can increase accuracy, speed, and reduce false alarms.

According to various embodiments, the mobile platform 130 may comprise a communications module 134. The communications module 134 at the mobile platform 130 may establish a communications link 160 with a communications module 114 at the source platform 110. The communications link 160 may be a wireless or wired communications link leveraging radio frequency, optical, or other such communication technologies. For example, the communications link 160 may leverage TCP/IP, Wi-Fi, Wi-Max, GSM, CDMA, or other communication mediums, technologies, or protocols.

The communications link 160 established between the mobile platform 130 and the source platform 110 may be used to relay information determined by the detector 132 in response to receiving the reflected beam 155. The communications link 160 may also be used to control, command, or position the mobile platform 130 as well as the manipulator arm 138 associated with the mobile platform 130. According to various embodiments, the mobile platform 130 may be controlled from the source platform 110 or other position within the field of operation. For initial placement or manual relocation, the mobile platform 130 may be man-portable. The performance range associated with the mobile platform 130 may be extended to the operating distance of the communications link 160.

A processing module 116 associated with the source platform 110 may perform signal processing and analysis operations on information received over the communications link 160 from the mobile platform 130. The signal processing and analysis operations can include processing the beam received at the detector 132 to determine a chemical composition of the measurement target 120. For example, spectrum analysis techniques may be employed within the signal processing operations.

It should be appreciated that the processing module 116 may also be located at the mobile platform 130, or distributed between the source platform 110 and the mobile platform 130 according to various embodiments. The processing module 116 may provide processing and analysis results to an operator or to other systems within a battlefield or theater domain. The processing module 116 may provide feedback to the mobile platform 130 on positioning or operating modes. The processing module 116 may also provide feedback to the mobile platform 130 for positioning the manipulator arm 138 associated with the mobile platform 130. This automatic remote positioning of the manipulator arm 138 by the processing module 116 can reduce human error and improve accuracy of measurements and detection.

Use of a remotely located source platform 110 can support large, complex, or expensive equipment for implementing the electromagnetic source 112 and processing modules 116. The ability to put more optical power on the target 120 and to use eye-safe laser wavelengths from the electromagnetic source 112 may dictate using larger laser systems and components than could be implemented on the mobile platform 130. The size, expense, power consumption, and portability of elements within the source platform 110 may have reduced impact on portable detection operation of the mobile platform 130 by positioning these elements remotely at the source platform 110.

The remotely located source platform 110 can support modification or upgrades to the electromagnetic source 112 and processing modules 116 without affecting the mobile platforms 130. The source platform 110 may also be deployed within a truck, trailer, or any other vehicle. The source platform 110 may also be man-portable for transporting. For example, the source platform 110 may be carried into a building and set up in a window or doorway.

Use of an updatable electromagnetic source 112 at the source platform 110 can support various optical techniques such as Laser Induced Breakdown Spectroscopy (LIBS), Surface Enhanced Raman Scattering (SERS), Coherent Antistokes Raman Scattering (CARS) and Differential Absorption LIDAR (DIAL). These technologies may be deployed by specifying the electromagnetic source 112 and, as appropriate, the detector 132. According to one or more embodiments, the BOEING DUAL MODE DUAL BAND optical detection technique may be employed. This technique can perform both DIAL and CARS simultaneously using eyesafe laser wavelengths in the Mid-Wavelength Infrared (MWIR) and the Long-Wavelength Infrared (LWIR) transmission regions.

Use of the mobile platform 130 to move the detector 132 into different locations around the target 120 can improve detection sensitivity and the acquisition of signals at the detector 132. Using the BOEING DUAL MODE DUAL BAND optical detection technique, the sensitivity level of vapor backscatter measurements can achieve sensitivity levels to less than several hundred parts-per-million for various explosive materials. In a transmission mode implementation, the sensitivity levels may be less. For example, an order of magnitude less. In addition, specifically locating the detector 132 for detection methods such as CARS can dramatically improve the sensitivity of the system 100.

Remote measurement using robots hosting an entire sensor package without the support of a remote source platform 110 may have limited performance due to limits on the size and associated capability of the sensors. Additionally, some robot implemented sensors may require the robot to place a sensor in contact with the actual explosive material on the target 120. Close proximity to the threat device places the robot in harms way. Also, a failure to make precise contact with the threat material may result in a low probability of detection in such systems. Due to the size constraints, such sensors may also have limited material identification capability without the flexibility to add capability to the sensor in support of an ever evolving threat agent environment.

One measurement technology, Laser Induced Breakdown Spectroscopy (LIBS) can use a high power pulse to convert an explosive material to plasma at range. The spectral content of the plasma event may then be measured to identify any explosive material present. Since LIBS may operate in the near infrared and visible light spectrum, atmospheric clutter from nitrogen and oxygen can dominate. Thus reducing the round trip detection path by placing a remote platform 130 closer to a target 120 may provide significant sensor benefits.

Another measurement technology, Infrared Absorption can illuminate a vapor 310 associated with a target 120. A measurement of the amount of signal lost may be performed in order to assess what material is present in the measurement target 120. Infrared absorption may operate in a transmission mode using a vapor transmission beam 340 for sensing Infrared absorption may include operation in the ultraviolet to near infrared regions where atmospheric clutter can cause detection problems. Again, reducing the round trip detection path by placing a remote platform 130 closer to a target 120 may provide significant sensor benefits.

Another measurement technology, Fourier Transform Infrared (FTIR) can sweep a set of frequencies through a vapor 310 sample. An interferometer may then be used to measure signal variation. A Fourier transform may then be applied to obtain a signal spectrum. Signal variation may be measured as opposed to absorption loss as measured in the Infrared Absorption technique. FTIR may be subject to interference, predominately from water. Again, reducing the round trip detection path by placing a remote platform 130 closer to a target 120 may provide significant sensor benefits. The computational complexity of Fourier analysis may also benefit from remote placement of larger, more powerful analysis system at a processing module 116 associated with the source platform 110.

Another measurement technology, Raman Spectroscopy can illuminate a sample at the target 120 with a precise wavelength that causes the sample to emit a unique wavelength characteristic of the material within the sample. Raman Spectroscopy can operate in the visible and ultraviolet spectral regions where interference may obscure the fluorescence of target material. Again, reducing the round trip detection path by placing a remote platform 130 closer to a target 120 may provide significant sensor benefits.

The remote platform enhanced detection system 100 may be used to detect any type of munitions. The remote platform enhanced detection system 100 may also be used to detect drugs, chemicals, biohazards, pollutants, pollen, or any other solids, plasmas, particles, or vapors.

Figure 2:
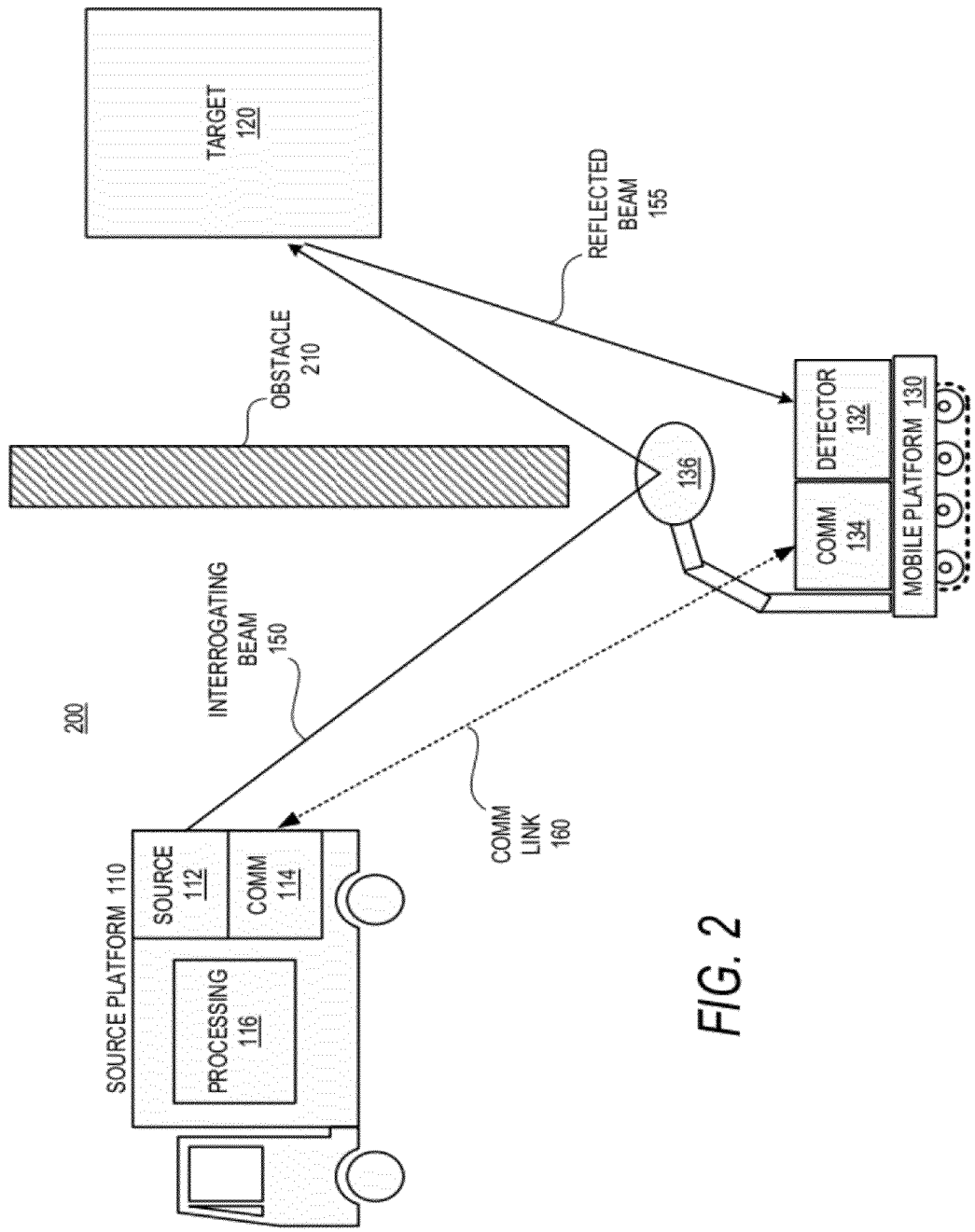
FIG. 2 is a schematic diagram illustrating a remote platform enhanced munitions detection system operating in the presence of an obstacle according to one or more embodiments presented herein.

Turning now to FIG. 2, a schematic diagram illustrates a remote platform enhanced munitions detection system 200 operating in the presence of an obstacle 210 according to one or more embodiments presented herein. When the line of sight between the source platform 110 and the target 120 is obscured by an obstacle 210, such as a wall, building, vehicle, or any other object, an electromagnetic reflector 136 may be provided at the mobile platform 130. The electromagnetic reflector 136 can be positioned by the mobile platform 130 to reflect the interrogating beam 150 from the source platform onto the target 120. The interrogating beam 150 may scatter from, reflect from, or transmit through the target 120 or vapor associated with the target 120 as a reflected beam 155 to be received by a detector 132 associated with the mobile platform 130. The mobile platform 130 may be commanded by the communications link 160 to position or reposition the electromagnetic reflector 136 in order to reflect the interrogating beam 150 properly onto the target 120. By providing non-line-of-sight capabilities, the remote platform enhanced munitions detector may operate in crowded environments without unnecessary repositioning of the source platform 110.

While the mobile platform 130 is illustrated as supporting both the electromagnetic reflector 136 and the detector 132, it should be appreciated that two mobile platforms 130 may be deployed where a first mobile platform 130 positions an electromagnetic reflector 136 to provide non-line-of-sight operation of the interrogating beam 150 while a second mobile platform 130 may support the detector 132 for receiving the reflected beam 155.

Figure 3:
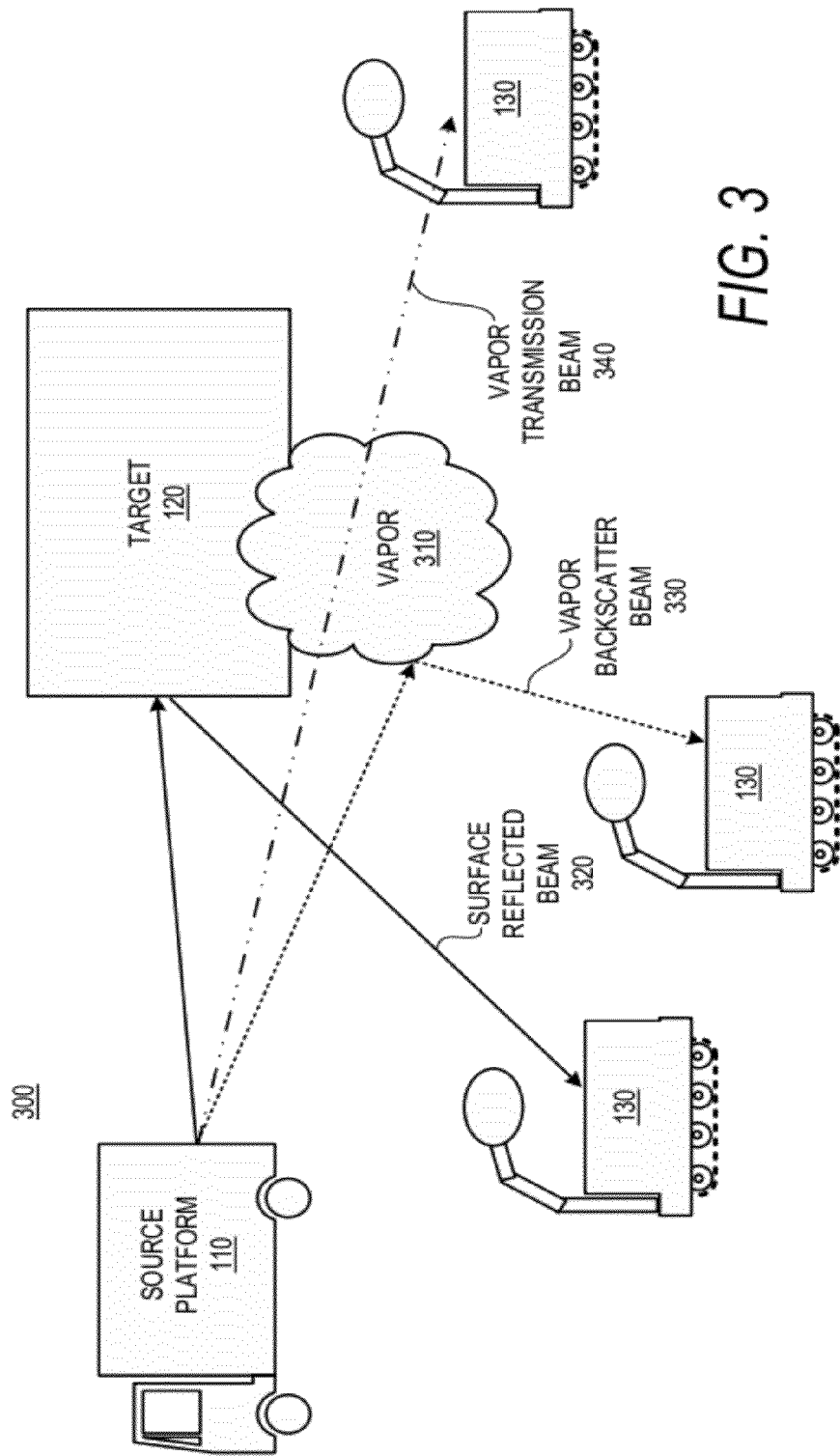
FIG. 3 is a schematic diagram illustrating a remote platform enhanced munitions detection system operating in various reflected and transmitted modes according to one or more embodiments presented herein.

Turning now to FIG. 3, a schematic diagram illustrates a remote platform enhanced munitions detection system 300 operating in various reflected and transmitted modes according to one or more embodiments presented herein. The source platform 110 may generate a surface reflected beam 320. The surface reflected beam 320 may reflect from the surface of the target 120 to be received at a detector 132 associated with a mobile platform 130. The source platform 110 may also generate a vapor transmission beam 340. The vapor transmission beam 340 may pass through a vapor 310 associated with the target 120 before being received at a detector 132 associated with a mobile platform 130. While passing through the vapor 310, the vapor transmission beam 340 may be transformed by interacting with particles and chemicals within the vapor 310, such that the transformation of the beam may be detected during signal processing. The source platform 110 may also generate a vapor backscatter beam 330. The vapor backscatter beam 330 may scatter off of particles or chemicals within the vapor 310 associated with the target 120. The vapor backscatter beam 330 may then be received at a detector 132 associated with a mobile platform 130.

It should be appreciated that the surface reflected beam 320, the vapor backscatter beam 330, and the vapor transmission beam 340 may actually originate as the same interrogating beam 150 or set of beams from one electromagnetic source 112. The specific reflection, backscattering, and transmission measurements may be differing applications of the same electromagnetic source 112. For example, according to one or more embodiments, a single interrogating beam 150 may partially reflect from a vapor as a backscatter beam 330 and also partially transmit through a vapor as a vapor transmission beam 340. In such a configuration, the backscatter beam 330 and the vapor transmission beam 340 may each be received at a separate, appropriately positioned, mobile platform 130.

It should be appreciated that the surface reflected beam 320, the vapor backscatter beam 330, and the vapor transmission beam 340 may operate in a non-line-of-sight measurement configuration such as discussed with respect to FIG. 2. In the non-line-of-sight measurement configuration, the surface reflected beam 320, the vapor backscatter beam 330, or the vapor transmission beam 340 may be reflected by an electromagnetic reflector 136 associated with a mobile platform 130 prior to interacting with the target 120 or the vapor 310.

Figure 4:
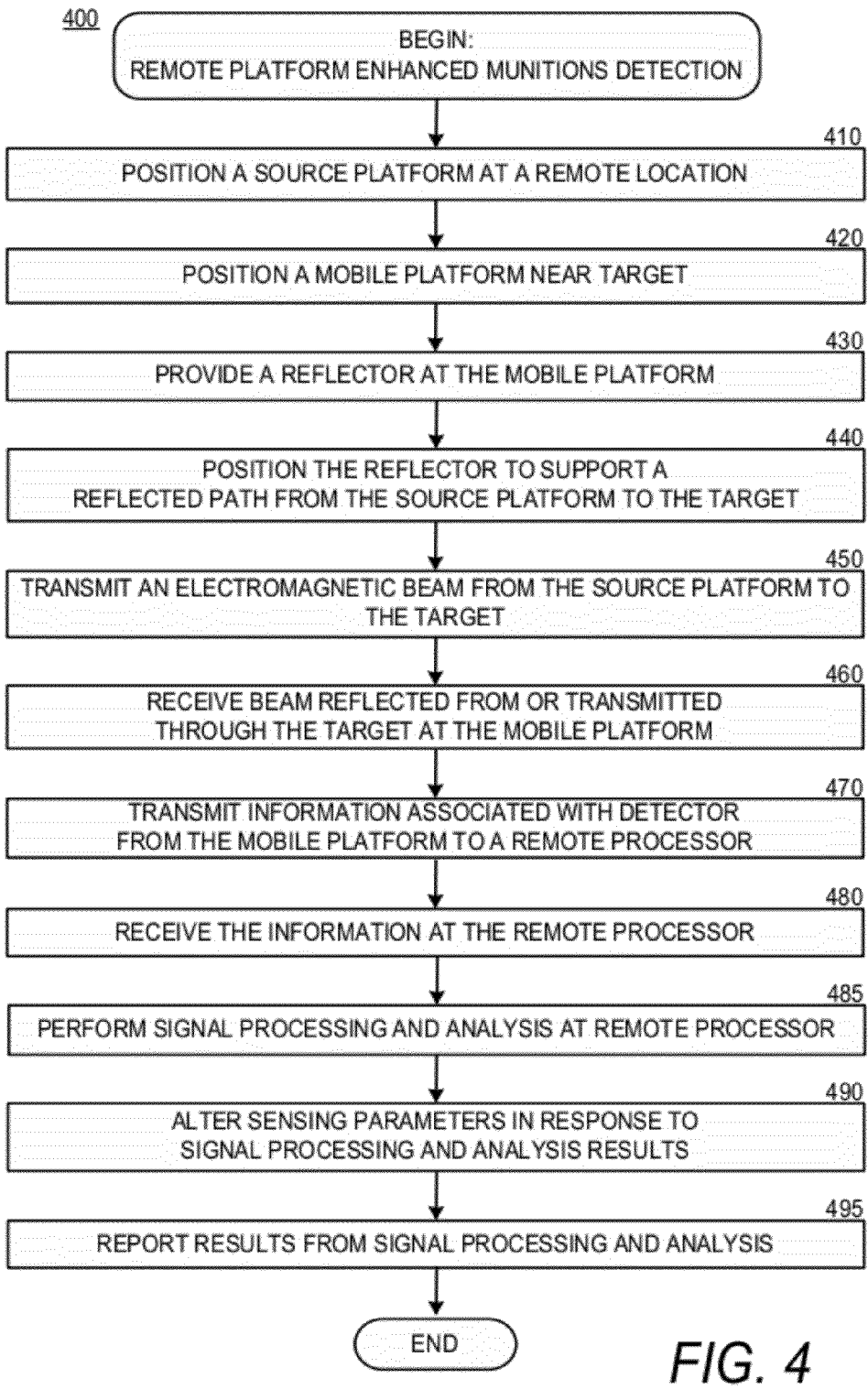
FIG. 4 is a flow diagram for a routine that illustrates aspects of a process for remote platform enhanced munitions detection according to one or more embodiments presented herein.

Turning now to FIG. 4, additional details will be provided regarding the embodiments presented herein for remote platform enhanced munitions detection. In particular, FIG. 4 is a flow diagram showing a routine 400 that illustrates aspects of a process for enhanced munitions detection according to embodiments presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 400 begins with operation 410 where a source platform 110 can be positioned at a remote location. Positioning the source platform 110 remotely from the target 120 can increase security of the measurement operation. At operation 420, a mobile platform 130 may be positioned near the target 120. Locally positioning the mobile platform 130 can support deployment of a detector 132 associate with the mobile platform 130 closer to the target 120 or a vapor 310 associated with the target 120.

At operation 430, an electromagnetic reflector 136 may be provided at the mobile platform 130. The electromagnetic reflector 136 may be a mirror or any other reflector of electromagnetic beams. At operation 440, the reflector 136 may be positioned to support a reflected path from the source platform 110 to the target 120. The electromagnetic reflector 136 may be used to support non-line of sight operation of the interrogating beam 150 from the source platform 110 to the target 120 in order to avoid an obstacle 210.

At operation 450, an electromagnetic beam such as the interrogating beam 150 may be transmitted from the source platform 110 to the target 120. The transmitted beam may be at a specified frequency and may be an optical beam such as a laser, a radio frequency beam, or any other electromagnetic beam. Single or multiple beams may be transmitted based upon the detection technique. The electromagnetic beam may be continuous wave, pulsed, or otherwise modulated.

At operation 460, a reflected beam 155 may be reflected from, or transmitted through, the target 120 or a vapor 310 associated with the target 120. The reflected beam 155 may be received at a detector 132 associated with the mobile platform 130. The detector 132 may be positioned by the mobile platform 130 to different positions in order to receive backscatter transmission or surface reflection measurements according to embodiments.

At operation 470, information determined in response to receiving the reflected beam 155 at the detector 132 may be transmitted from the mobile platform 130 to a remote processing module 116. The remote processing module 116 may be associated with the source platform 110 or otherwise remotely located. The information may be transmitted over a communications link 160 established between a communications module 114 associated with the source platform 110 and a communications module 134 associated with a mobile platform 130.

At operation 480, the information may be received at the remote processing module 116 associated with the source platform 110 for signal processing and analysis operations. At operation 485, the signal processing and analysis operations may be performed at the remote processing module.

At operation 490, sensing parameters associated with the remote platform enhanced munitions detector detection system may be altered in response to results from the signal processing and analysis performed at the processing module 116. Altering the sensing parameters may include changing the frequency of the interrogating beam 150, changing the position of the remote platform 130, or changing the position of the electromagnetic reflector 136. Such changes may, for example, cause subsequent measurements to contact different areas of the target 120 or transmit through different regions of the vapor 310. Altering the operation of the interrogating beam 150 may also include changing power levels, altering frequencies, or changing modulation schemes in order to improve sensing measurements performed upon the target 120. At operation 495, the results of the signal processing and analysis may be reported. The results may be reported to an operator or to remote systems associate with the operation of the munitions detection system.

Figure 5:
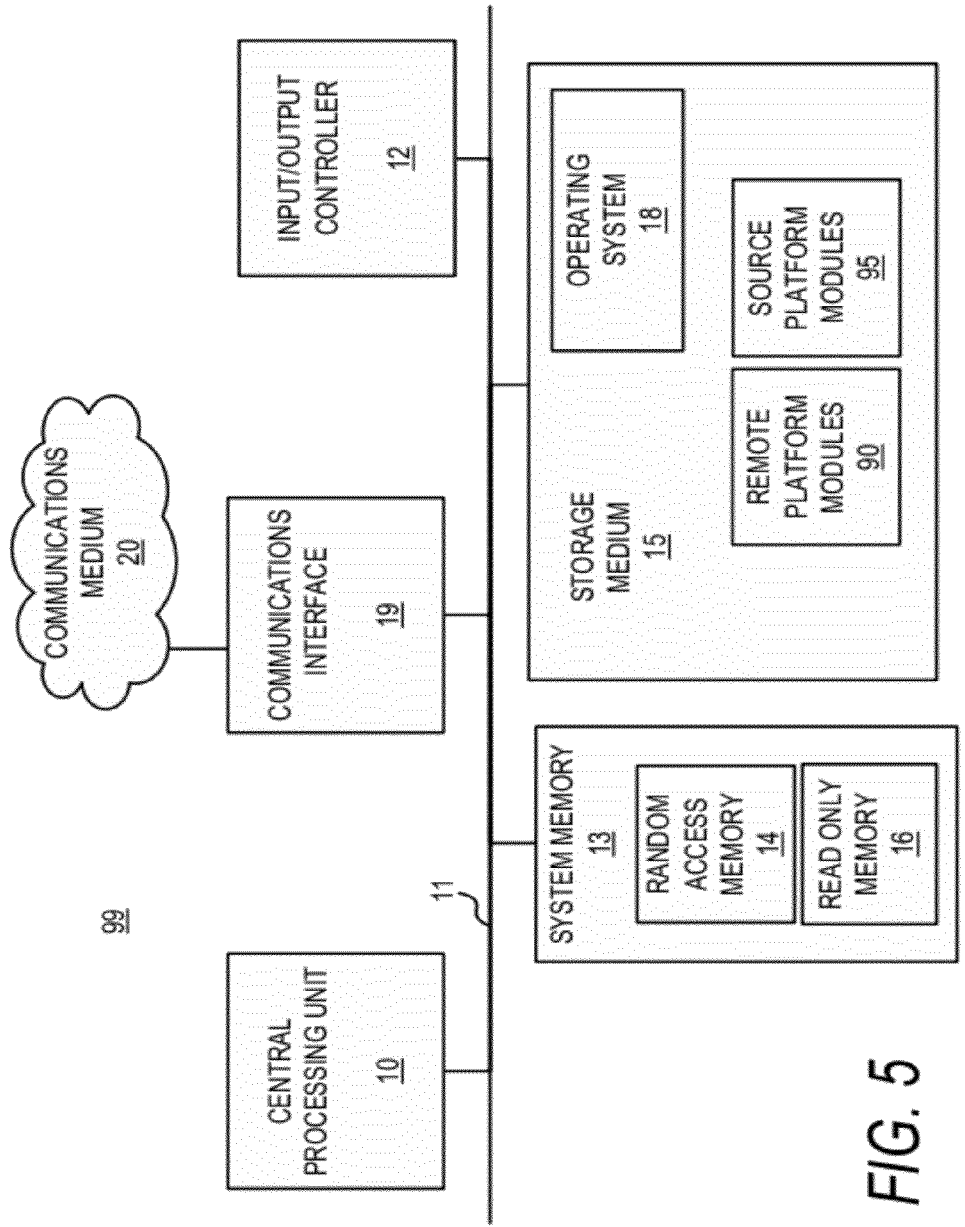
FIG. 5 is a computer architecture diagram illustrating computing system hardware capable of performing remote platform enhanced munitions detection according to one or more embodiments presented herein.

Turning now to FIG. 5, an illustrative computing device 99 can execute software components described herein for remote platform enhanced munitions detection. The computer architecture shown in FIG. 5 illustrates a computing device 99 associated with one or more components of the enhanced munitions detection system such as the mobile platform 130, the source platform 110, or the processing module 116. The computer 99 may be utilized to execute aspects of the software components presented herein. It should be appreciated however, that the described software components can also be executed on other computing environments.

The computer 99 architecture illustrated in FIG. 5 can include a central processing unit 10 (CPU), a system memory 13, including a random access memory 14 (RAM) and a read-only memory 16 (ROM), and a system bus 11 that can couple the system memory 13 to the CPU 10. A basic input/output system containing the basic routines that help to transfer information between elements within the computer 99, such as during startup, can be stored in the ROM 16. The computer 99 may further include a storage medium 15 for storing an operating system 18, software, data, and various program modules, such as those associated with enhanced munitions detection, processing module 116, remote platform modules 90, and source platform modules 95. The processing module 116, remote platform modules 90, and source platform modules 95 may include the enhanced munitions detection process 400 functionality presented herein.

The storage medium 15 can be connected to the CPU 10 through a storage controller (not illustrated) connected to the bus 11. The storage medium 15 may comprise computer-readable media configured to support non-volatile storage for the computer 99.

Although the description of computer-readable media contained herein refers to a storage device, such as non-volatile memory, it should be appreciated by those skilled in the art that computer-readable media can be any available computer storage media that can be accessed by the computer 99 or used to configure or load the computer 99. By way of example, and not limitation, these computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by, or used to configure, the computer 99.

The computer 99 may support logical connections to remote computers through a communications medium 20 such as a network, a wired network, a wireless network, or a wireless radio command and control link. The computer 99 may connect to the communications medium 20 using a communications interface 19 connected to the bus 11.

The computer 99 may also include an input/output controller 12 for receiving and processing input from various devices, interfaces, or peripherals (not illustrated). Similarly, the input/output controller 12 may provide output various devices, interfaces, or peripherals (also not illustrated).

Based on the foregoing, it should be appreciated that technologies for remote platform enhanced munitions detection are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for enhanced munitions detection, the method comprising:
   positioning a remote electromagnetic reflector configured to direct a first electromagnetic beam to a measurement target;
   transmitting the first electromagnetic beam from a source platform to the measurement target via the remote electromagnetic reflector, wherein the first electromagnetic beam interacts with the measurement target transforming the first electromagnetic beam into a second electromagnetic beam;
   receiving the second electromagnetic beam at a remote mobile platform coupled to the remote electromagnetic reflector;
   processing the second electromagnetic beam; and
   determining characteristics of the measurement target in response to processing the second electromagnetic beam.

2. The method of claim 1, wherein the remote mobile platform comprises a manipulator arm for positioning the remote electromagnetic reflector.

3. The method of claim 1, wherein processing the second electromagnetic beam comprises transmitting a signal associated with the second electromagnetic beam to a remote processing module.

4. The method of claim 1, further comprising updating a position of the remote mobile platform in response to processing the second electromagnetic beam.

5. The method of claim 1, wherein the second electromagnetic beam is reflected from a surface of the measurement target.

6. The method of claim 1, wherein the second electromagnetic beam is backscattered from a vapor.

7. The method of claim 1, wherein the second electromagnetic beam is transmitted through a vapor.

8. An enhanced detection system comprising:
   an electromagnetic source configured to transmit a first electromagnetic beam to a measurement target, wherein the first electromagnetic beam interacts with the measurement target transforming the first electromagnetic beam into a second electromagnetic beam;
   a mobile platform positionable proximate to the measurement target and comprising an electromagnetic reflector configured to direct the first electromagnetic beam to the measurement target; and
   a detector associated with the mobile platform and configured to receive the second electromagnetic beam.

9. The detection system of claim 8, further comprising a first communications module associated with the mobile platform, a second communications module associated with a remote processing module, wherein information coupled from the detector is transmitted from the first communications module to the second communications module to be coupled to the remote processing module.

10. The detection system of claim 8, wherein the mobile platform comprises a manipulator arm configured to position the electromagnetic reflector.

11. The detection system of claim 8, wherein the electromagnetic source is a laser.

12. A method for enhanced munitions detection, the method comprising:
    positioning a remote electromagnetic reflector configured to direct a first electromagnetic beam to a measurement target;
    transmitting the first electromagnetic beam from a source platform to the measurement target via the remote electromagnetic reflector, wherein the first electromagnetic beam interacts with the measurement target transforming the first electromagnetic beam into a second electromagnetic beam;
    receiving the second electromagnetic beam at a remote mobile platform, wherein the remote mobile platform comprises a manipulator arm for positioning the remote electromagnetic reflector;
    processing the second electromagnetic beam; and
    determining characteristics of the measurement target in response to processing the second electromagnetic beam.

* * * * *